US007643686B2

(12) United States Patent
Kraus et al.

(10) Patent No.: US 7,643,686 B2
(45) Date of Patent: Jan. 5, 2010

(54) MULTI-TIERED IMAGE CLUSTERING BY EVENT (75) Inventors: Bryan D. Kraus, Rochester, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 915 days.

(21) Appl. No.: 11/197,243

(22) Filed: Aug. 4, 2005

(65) Prior Publication Data

US 2006/0104520 A1 May 18, 2006

Related U.S. Application Data (63) Continuation-in-part of application No. 10/997,411, filed on Nov. 17, 2004.

(51) Int. Cl.
*G06K 9/62* (2006.01)

(52) U.S. Cl. ..................................................... 382/225

(58) Field of Classification Search .................. 382/225
See application file for complete search history.

(56) References Cited

U.S. PATENT DOCUMENTS

| 5,796,924 | A | * | 8/1998 | Errico et al. ................... 706/25 |
| 5,812,975 | A | * | 9/1998 | Komori et al. ............... 704/256 |
| 6,029,195 | A | * | 2/2000 | Herz ........................... 725/116 |
| 6,185,314 | B1 | * | 2/2001 | Crabtree et al. ............. 382/103 |
| 6,345,119 | B1 | * | 2/2002 | Hotta et al. .................. 382/225 |
| 6,351,556 | B1 | * | 2/2002 | Loui et al. ................... 382/164 |
| 6,460,036 | B1 | * | 10/2002 | Herz ............................ 707/10 |
| 6,606,411 | B1 | * | 8/2003 | Loui et al. ................... 382/224 |
| 6,636,648 | B2 | * | 10/2003 | Loui et al. ................... 382/284 |
| 6,671,666 | B1 | * | 12/2003 | Ponting et al. .............. 704/233 |
| 2003/0158828 | A1 | * | 8/2003 | Ikeda et al. ................... 706/12 |

FOREIGN PATENT DOCUMENTS

EP          0 990 996 A2      4/2000

OTHER PUBLICATIONS

Automated Even Clustering and Quality Screening of Consumer Pictures for Digital Albuming, IEEE Transactions on Multimedia, vol. 5, No. 3, Nov. 2003.*
Co-pending U.S. Appl. No. 10/413,673, Loui & Pavie, *A Method for Automatically Classifiring Images Into Events*.
Co-pending U.S. Appl. No. 10/706,145, Loui & Pavie; *A Method for Automatically Classifying Images Into Events*.
Co-pending U.S. Appl. No. 10/696,115, Loui & Pavie, *A Method for Automatically Classifying Images Into Events*.

(Continued)

*Primary Examiner*—Bhavesh M Mehta
*Assistant Examiner*—David P Rashid
(74) *Attorney, Agent, or Firm*—Robert L. Walker (57) ABSTRACT In a method for classifying a sequence of records into events based upon feature values, such as time and/or location, associated with each of the records, feature differences between consecutive records are determined. The feature differences are ranked. A sequence of three or more clusters of feature differences is computed. The clusters are arranged in decreasing order of relative likelihood of respective feature differences representing separations between events. The records can be inclusive of images.

26 Claims, 6 Drawing Sheets

OTHER PUBLICATIONS

"Home Photo Content Modeling for Personalized Event-Based Retrieval", Joo-Hwee Lim et al., IEEE MultiMedia, IEEE Computer Society, vol. 10 (4), Oct.-Dec. 2003, pp. 28-37.

Co-pending U.S. Appl. No. 10/413,673, Loui & Pavie, *A Method for Automatically Classifying Images Into Events*, filing date Apr. 15, 2003.

Co-pending U.S. Appl. No. 10/706,145, Loui & Pavie, *A Method for Automatically Classifying Images Into Events*, filing date Nov. 12, 2003.

Co-pending U.S. Appl. No. 10/696,115, Loui & Pavie, *A Method for Automatically Classifying Images Into Events*, filing date Oct. 29, 2003.

Alexander C. Loui and Andy Savakis, "Automated Event Clustering and Quality Screening of Consumer Pictures for Digital Albuming", IEEE Transactions on Multimedia, vol. 5, No. 3, Sep. 2003, pp. 390-402, XP002374762, USA.

\* cited by examiner

FIG. 9

MULTI-TIERED IMAGE CLUSTERING BY EVENT

CROSS REFERENCE TO RELATED APPLICATIONS

This application is a continuation-in-part of commonly-assigned copending U.S. Ser. No. 10/997,411, filed 17 Nov. 2004, entitled "VARIANCE-BASED EVENT CLUSTERING" and filed in the names of Alexander C. Loui, and Bryan D. Kraus, which is hereby incorporated herein by reference.

Reference is made to commonly-assigned copending U.S. Ser. No. 10/413,673, entitled "A Method for Automatically Classifying Images into Events" and filed 15 Apr. 2003 in the names of Alexander C. Loui and Eric S. Pavie, and commonly-assigned copending U.S. Ser. No. 10/706,145, entitled "A Method for Automatically Classifying Images into Events" and filed 12 Nov. 2003 in the names of Alexander C. Loui, and Eric S. Pavie, and commonly-assigned copending U.S. Ser. No. 10/696,115, entitled "A Method for Automatically Classifying Images into Events" and filed 29 Oct. 2003 in the names of Alexander C. Loui, and Eric S. Pavie, all of which are incorporated herein by reference.

FIELD OF THE INVENTION

The invention relates to image processing, in which images are automatically classified by events and the like using image information and metadata, and more particularly, to multi-tiered image clustering.

BACKGROUND OF THE INVENTION

Pictorial images and other records are often classified by event, for convenience in retrieving, reviewing, albuming, and otherwise manipulating the images. Typically, this has been achieved by manually or by automated methods. In some cases, images and other records have been further classified by dividing events into subevents. Further divisions are sometimes provided.

Although the presently known and utilized methods for partitioning images are satisfactory, there are drawbacks. Manual classification is effective, but is slow and burdensome unless the number of images is small. Automated methods are available, but tend to have a number of constraints, such as inherent inaccuracy due to lack of consistency, flexibility, and precision.

Some automated methods partition images into groups having similar image characteristics based upon color, shape or texture. This approach can be used to classify by event, but is inherently difficult when used for that purpose. "Home Photo Content Modeling for Personalized Event-Based Retrieval", Lim, J-H, et al., *IEEE Multimedia*, Vol. 10(4), October-December 2003, pages 28-37 discloses classification of images by event using image content.

Many images are accompanied by metadata, that is, associated non-image information that can be used to help grouping the images. One example of such metadata is chronological data, such as date and time, and geographic data, such as Global Positioning System ("GPS") geographic position data. These types of data are particularly suitable for grouping by event, since events are limited temporally and usually limited spatially. Users have long grouped images manually by looking at each image and sorting by chronology and geography. The above-cited article by Lim et al., suggests use of chronological and geographic data in automated image classification by event using image content.

U.S. Pat. No. 6,606,411, to A. Loui, and E. Pavie, entitled "A method for automatically classifying images into events," issued Aug. 12, 2003 and U.S. Pat. No. 6,351,556, to A. Loui, and E. Pavie, entitled "A method for automatically comparing content of images for classification into events," issued Feb. 26, 2002, disclose clustering image content by events using a two-means event clustering algorithm. Two-means event clustering uses both time and image content to group images.

The 2-means algorithm establishes event boundaries in two general steps. First, the set is divided into events based on the time difference between images. The images are then compared across the event borders and events are merged as necessary. Once event boundaries are established with the procedure above, additional steps are taken to further divide the events into sub-events. Like event detection, this process involves multiple steps and considers both image content and date-time. However, the role of the two information sources is reversed. The algorithm first compares the content of adjacent images and tentatively marks sub-event boundaries. These sub-events are then checked against the date-time information and are merged if the boundaries don't align with real time differences.

Although the 2-means algorithm taught by these references can yield fair or good results, extensive tests revealed problems with its consistency. When image sets included large time differences, they were often skewed by these values, resulting in fewer found events. In the most extreme cases, the addition of a single image prevented the detection of all other events. This consistency problem is a shortcoming.

It would thus be desirable to provide automatic clustering methods, computer programs, and apparatus, which can automatically classify and sort large collections of images relatively consistently and with a relatively low rate of error.

SUMMARY OF THE INVENTION

The invention is defined by the claims. The invention, in broader aspects, provides a method for classifying a sequence of records into events based upon feature values, such as time and/or location, associated with each of the records. In the method, feature differences between consecutive records are determined. The feature differences are ranked. A sequence of three or more clusters of feature differences is computed. The clusters are arranged in decreasing order of relative likelihood of respective feature differences representing separations between events. The records can be inclusive of images.

It is an advantageous effect of the invention that improved automatic clustering methods, computer programs, and apparatus are provided, which can automatically classify and sort large collections of images relatively consistently and with a relatively low rate of error.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the method, a database of records is classified into a plurality of different clusters and a remainder, based upon different relative likelihoods that feature value differences between records represent separations between events.

In the following description, some embodiments of the present invention will be described as software programs. Those skilled in the art will readily recognize that the equivalent of such software can also be constructed in hardware. Records are generally described in relation to images and image sequences. Other types of records by themselves or in any combination with images and image sequences are dealt with in a like manner, but modified to provide appropriate output differences. Output can be provided by the communication of information reflecting clustering results.

Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 2:
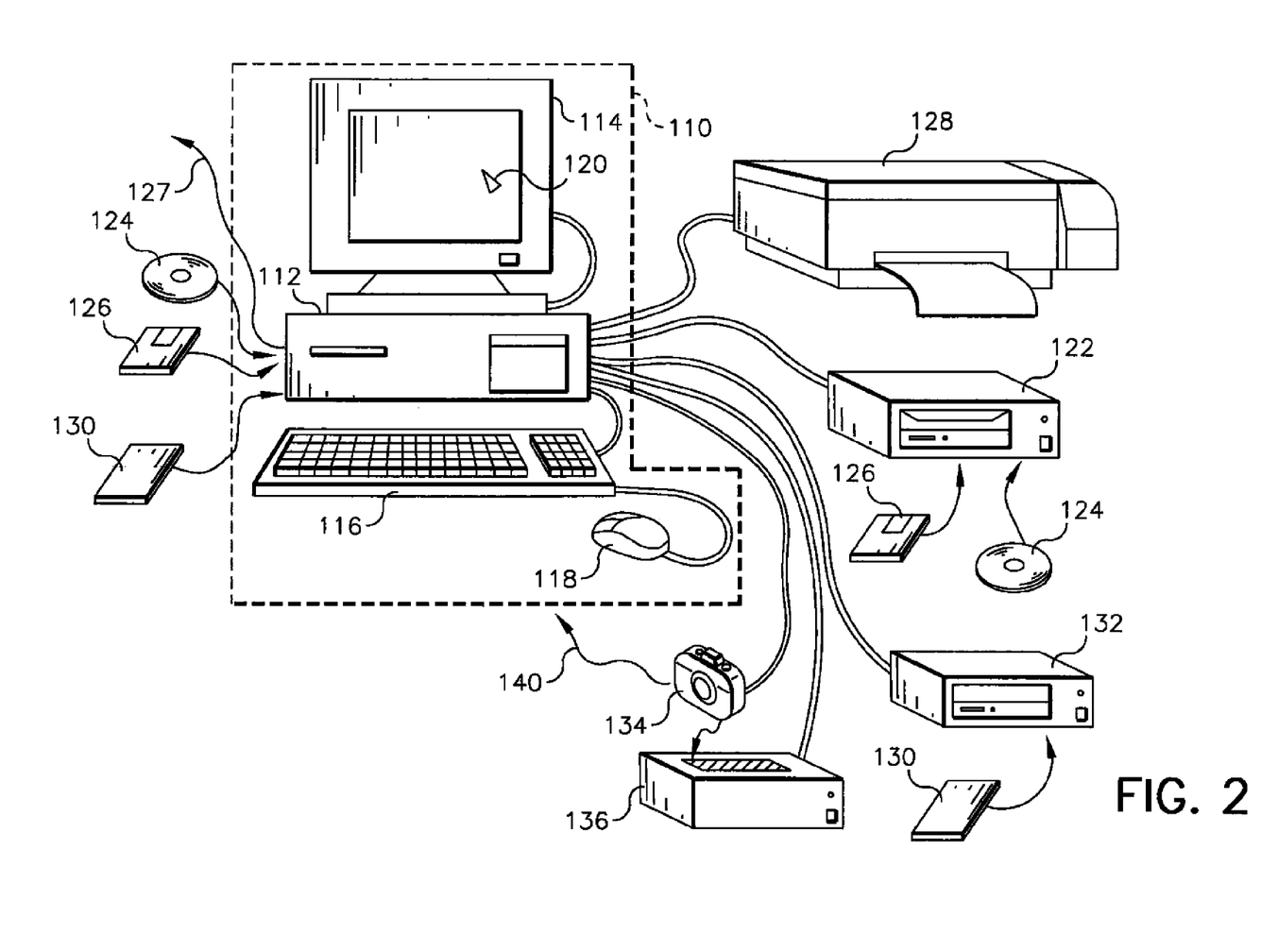
FIG. 2 is a diagrammatical view of an embodiment of the system.

The present invention can be implemented in computer hardware and computerized equipment. For example, the method can be performed in a digital camera, a digital printer, and on a personal computer. Referring to FIG. 2, there is illustrated a computer system 110 for implementing the present invention. Although the computer system 110 is shown for the purpose of illustrating a preferred embodiment, the present invention is not limited to the computer system 110 shown, but may be used on any electronic processing system such as found in digital cameras, home computers, kiosks, retail or wholesale photofinishing, or any other system for the processing of digital images. The computer system 110 includes a microprocessor-based unit 112 (also referred to herein as a digital image processor) for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122, which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device provides a final image that has been subject to transformations. The output device can be a printer or other output device that provides a paper or other hard copy final image. The output device can also be an output device that provides the final image as a digital file. The output device can also include combinations of output, such as a printed image and a digital file on a memory unit, such as a CD or DVD.

The present invention can be used with multiple capture devices that produce digital images. For example, FIG. 2 can represent a digital photofinishing system where the image-capture device is a conventional photographic film camera for capturing a scene on color negative or reversal film, and a film scanner device for scanning the developed image on the film and producing a digital image. The capture device can also be an electronic capture unit (not shown) having an electronic imager, such as a charge-coupled device or CMOS imager. The electronic capture unit can have an analog-to-digital converter/amplifier that receives the signal from the electronic imager, amplifies and converts the signal to digital form, and transmits the image signal to the microprocessor-based unit 112.

The microprocessor-based unit 112 provides the means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images -in a manner such that a pleasing looking image is produced by an image output device. Those skilled in the art will recognize that the present invention is not limited to just these mentioned image processing functions.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect.

The general control computer shown in FIG. 2 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device. Before describing the present invention, it facilitates understanding to note that the present invention can be utilized on any well-known computer system, such as a personal computer.

It should also be noted that the present invention can be implemented in a combination of software and/or hardware and is not limited to devices, which are physically connected and/or located within the same physical location. One or more of the devices illustrated in FIG. 2 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better -or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

The methods classify using feature values associated and/or derived from the individual images. The feature values can represent or be derived from metadata, that is, non-image information that is associated with individual images in some manner that permits transfer of the information along with the images. For example, metadata is sometimes provided within the same file as image information. Examples of such information include: date, time, flash firing, illuminant type, lens focal length, GPS data, camera type, camera serial number, and user name.

The "feature values" can represent non-image information of any kind that can be presented in ordinal form allowing ranking of feature values. Feature values are treated herein as numerical values. It will be understood that if feature values are non-numerical, a conversion to numerical values proportional to event-related differences, will be provided during use. Some examples of different types of features values suitable for image-type records (records that are or include images) are the following: time, date, date-time (date and time), location, presence of people, presence of specific individuals, scene type, image characteristics, such as colorfulness, kinds or colors, and sharpness, and combinations of two or more of these.

The methods are most beneficial for the grouping of images by events using non-image information that can have a large number of possible values, such as chronological data and geographic data. Such data can be generalized as providing a difference from a reference or a difference internal to the data. The feature values would generally be provided along with associated image files, but can be separated from image files, if information associating feature values and individual images is not lost.

It is convenient if feature values are unique within a given database; if not, rank ordering rules can be provided to allow ranking of duplicates. Rank ordering rules can order duplicates arbitrarily or based upon an additional measure, such as other metadata associated with images. The effect of duplicate feature values is unimportant to clustering unless the relative percentage of duplicates is large. In that case, clustering using a particular feature may not closely correlate with actual events and it may be desirable to change the feature used for clustering.

The differences in feature values used for ranking can be relative to an established standard, such as the date and time or GPS geographic coordinates. The difference can also be relative to an arbitrary reference. (For convenience, much of the following discussion relates to feature values based upon chronology and/or geography.) For example, one or several cameras can be synchronized to an arbitrary reference time. Likewise, a particular GPS coordinate set can be selected as an arbitrary starting point for later distance measurements. The reference itself does not have to be fixed in time or place. Distances can be relative to a reference camera or other movable feature. In the same manner, times can be measured in differences from a particular reference time or closest of a sequence of reference times. For example, images can be provided by a plurality of independently operated cameras. The movable reference can be a designated one of the cameras. In this case, the reference camera can have different absolute spatial locations when images are captured by the other cameras and the differences can be separations from the reference camera at the times of capture of different images.

Internal differences for a set of images can be differences of an image from one or more other neighboring or otherwise related images in the set. Convenient differences are from nearest neighbors or the preceding image in an ordered sequence. Metadata from images captured originally on film generally includes this information. Digital cameras commonly assign filenames to images in a sequential manner. Specific examples of internal differences include elapsed time and distance from a previous image.

Internal differences can be based upon averages of all of the records or of subsets of predetermined size. The averaging can be an arithmetic mean. Other "averages", such as median and mode, can be used as appropriate.

Features are generally discussed herein as being scalar (that is, feature values have a dimensionality of one). Feature values can have higher dimensionalities. For example, a convenient feature can be a vector of date-time and geographic distance. With higher dimensional features, the boundaries can be chosen a number of ways. For example, the components of the vector can be scaled and combined into a single scalar value. The scalar values can then be clustered in the same manner as scalar features using techniques like 2-means clustering. In another approach, separate boundaries can be found for each of the components of the vector using the clustering techniques for scalar features. The vectors themselves can then be classified based on the union or intersection of the component groups. For example, consider a vector of time difference and geographic distance. Using 2-means clustering a boundary is found between time differences more and less likely to be events. A similar boundary is found using 2-means clustering for the distance component. The vectors of time difference and distance are then classified based on the clustering of the components. If both components of a vector are considered more likely to be an event than the vector is considered more likely to be an event, otherwise the vector is considered less likely to be considered an event.

The feature values can be a measure of the similarity of different records. For example, with images the feature values of image content similarity can be based on such measures as image contrast, dynamic range, and color characteristics. Another image content based feature value is block histogram differences of chronologically ordered images. In this case, the horizontal axis of a graph represents the block histogram difference, which is a measure of relative difference (or dissimilarity) of two successive chronologically ordered images.

The block histogram difference between pair of images within an event will be small, whereas the corresponding difference between a pair of images at the event boundary will be relatively large. Block histogram differences can also be used with data ordered in another way or with non-ordered data.

The block histogram difference is conveniently provided as the remainder after subtracting a block histogram similarity from unity (or another value associated with identity). Block histogram similarity can be determined in ways known to those of skill in the art, such as the procedure described in U.S. Pat. No. 6,351,556, which is hereby incorporated herein by reference.

In a particular embodiment, the block histogram difference is represented by the equation:

$$\text{block histogram difference} = 1 - \text{Inter}(R, C)$$

where Inter (R, C) is the histogram intersection equation:

$$\text{Inter}(R, C) = \frac{\sum_{i=1}^{n} \min(R_i, C_i)}{\sum_{i=1}^{n} R_i}$$

where R and C are two successive images (also referred to as a reference image and a candidate image, respectively), and n is the number of bins in the histogram.

An alternative block histogram difference determination method using predetermined thresholds, which is also suitable, is disclosed in U.S. Pat. No. 6,606,411, which is hereby incorporated herein by reference.

The feature values are optionally scaled with a scaling function prior to averaging. The scaling function is a continuous mathematical function that is invertible and has a positive, decreasing slope. As a result, the scaling function maintains small feature value differences and compresses large feature value differences. A scaling function for a particular use can be determined heuristically. The feature values can be arranged in a histogram, which is modified, using the scaling function, to provide a scaled histogram.

The methods are generally discussed herein in the context of classification of all of the records in a database. This is not necessarily the case. For example, some records can be manually or automatically excluded from clustering. The method can also be directed to grouping representative records of pre-existing groups. In view of this, the term "database of records" discussed in relation to the methods herein, can be considered to represent a set of records that can be clustered at a particular time and feature differences are between records of that set. Such a set of records may or may not be coextensive with an underlying physical or logical record collection.

Figure 1:
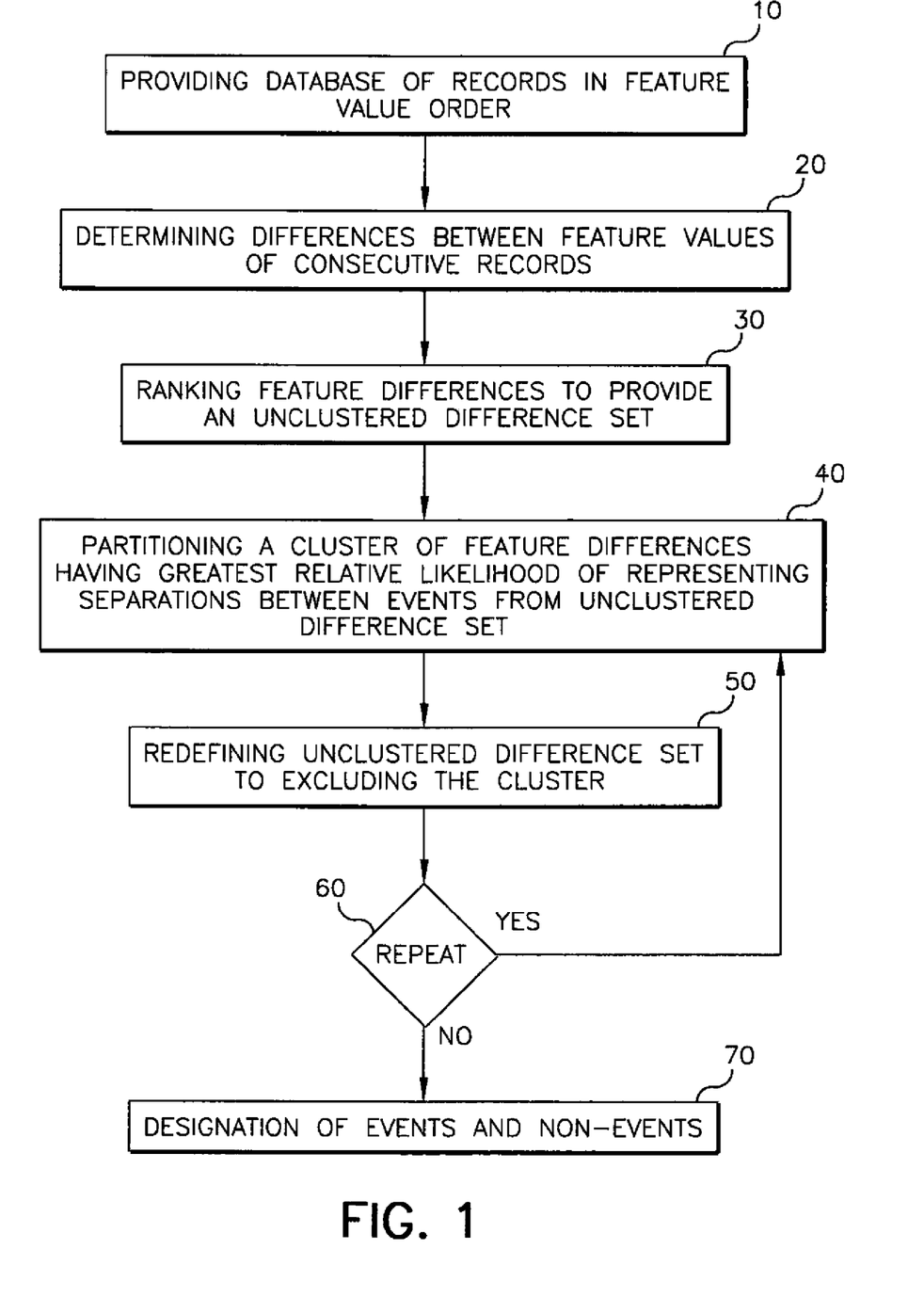
FIG. 1 is a flowchart showing features of the method.

FIG. 1 is a flow diagram illustrating an overview of the method. Digitized records are input into the computer system where a software program of the present invention classifies them into distinct categories. The records are ranked in feature value order, unless this has already been done, and the records are provided (10) for classification. In an embodiment in which the records are images and the ranking feature is date and time of capture of the respective image, the images are ranked in chronological order.

Figure 4:
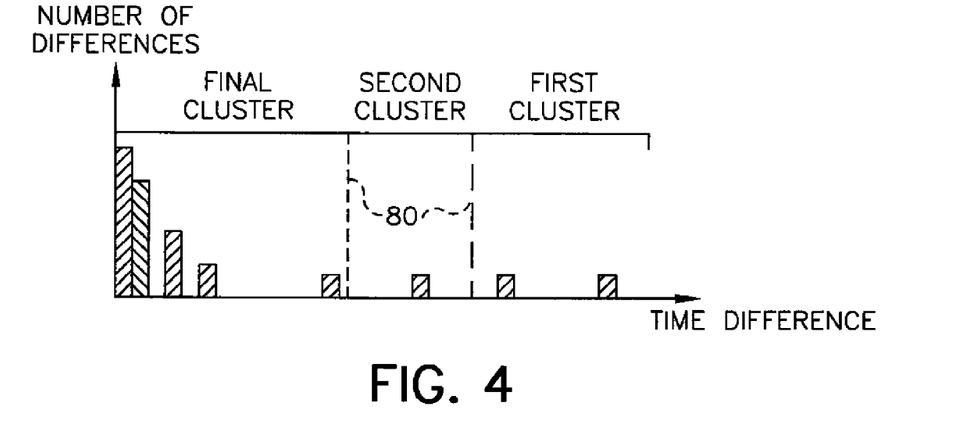
FIG. 4 is a histogram of time differences in an embodiment of the method of FIG. 1. Boundaries and clusters are indicated.

Feature value differences (also referred to herein as "feature differences") between consecutive records are next determined (20). For example, this can be time differences between capture date-time values associated with images. The feature differences are rank ordered (30), in a histogram or otherwise. An example of a histogram is shown in FIG. 4.

In this case, the feature is time and the abscissa of the histogram is time difference in a unit such as minutes, and the ordinate of the histogram is the number of images having the indicated time difference. Images are indicated by darkened blocks. Boundaries between three clusters are shown by dashed lines 80.

A histogram or other ranking can be scaled using a time difference scaling function to provide a scaled histogram, which takes the place of the original histogram. The scaling provides for more convenient manipulation of feature differences having a large range of values that can be compressed without unacceptable loss of information. In the example histogram just discussed, such scaling can reduce a time difference range overall, while maintaining small time differences and compressing large time differences. The scaling should be selected such that the compression does not change clustering in later classification steps.

The rank ordered feature differences define an unclustered difference set. Clustering is then started by partitioning (40) from the unclustered difference set a cluster of feature differences representing separations between events. This can also be described as calculating or computing the first cluster and a first boundary between the cluster and the remainder of the feature differences.

The feature differences in the first cluster are more likely to represent separations between events than are the feature differences of the remainder. Specific procedures for the computation are discussed below in detail.

An event is a grouping of records that reflects a grouping in the information on which the records are based. For example, when used in relation to image capture, the term "event" is defined herein as a significant occurrence or happening as perceived by the subjective intent of the user of the image capture device. A "boundary" is a value level in a histogram or other ranking of feature value differences that separates two groups having different likelihoods of being events.

The boundary, in addition to defining the first cluster, redefines (50) the remainder of the feature differences as an unclustered difference set for the calculation (40) of the next cluster and the next boundary. (Each calculation step (40) is also referred to herein as a "tier".) The second boundary defines the second cluster and again redefines (50) the remaining unclustered feature differences as the unclustered difference set for the next iteration.

Figure 3:
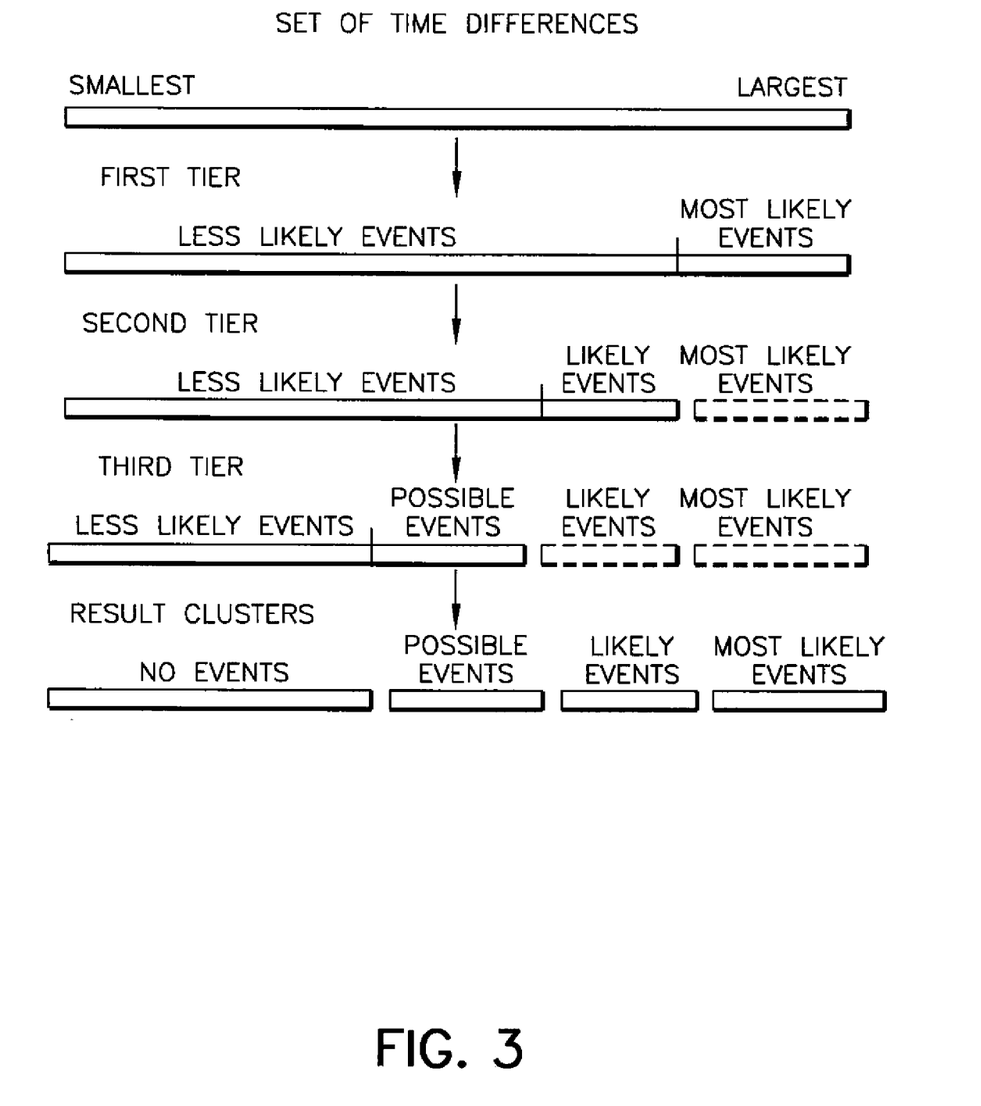
FIG. 3 is a diagram illustrating the classification into clusters in the method of FIG. 1.

Referring to FIG. 3, the result of the repeated calculation steps is a sequence of three or more mutually exclusive clusters of time differences, in decreasing order of the relative likelihood of the respective time differences being between events. In other words, a cluster is first calculated that has feature differences having the greatest likelihood of representing separations between events; then the feature differences of the first cluster are removed from the unclustered difference set and a next cluster is calculated having feature differences with the next greatest likelihood of representing separations between events. This procedure can be repeated sequentially partitioning clusters from the unclustered difference set. The partitioning provides the clusters in decreasing order of relative likelihood of respective feature differences representing separations between events.

The last unclustered difference set remaining after all boundaries have been calculated is also referred to herein as a final "cluster". The final cluster of remaining feature differences after all of the tiers have been determined, represents a group of feature differences that are least likely to represent separations between events, that is, the final cluster is a group of feature differences within events. The final cluster can also be referred to as the "non-event" cluster.

The calculation of tiers continues (60) for a predetermined number of iterations or until a stopping criterion is reached. An example of a suitable stopping criterion is a limit feature difference. In this case, the computing of feature difference clusters continues until a limit feature difference is reached. This can be determined, for example, by checking the range of feature differences in each cluster of time differences following calculation of that cluster. If the limit feature difference is found, the cluster is discarded and the sequence is restored to the feature difference clusters present at the previous iteration. Forward-looking procedures could alternatively be used to make the same kind of determination. In a particular embodiment, the feature difference is a time difference and the limit feature difference (the stopping criterion) is a minimum duration in the range of 8 to 60 minutes, or more preferably 16 minutes. (Times herein are inclusive of ranges provided by rounding off to the indicated values.) The stopping criterion can be a user decision to stop. For example, the user interface can display the event organization after the calculation of each tier. After inspecting the clustering, the user can decide if finer event distinctions are desired. If finer distinctions are desired, additional tiers can be calculated until the user is satisfied or another stopping criterion is reached.

The calculation of boundaries and clusters can be undertaken using a variety of different procedures including two-means event clustering as disclosed in U.S. Pat. No. 6,606,411. In two-means event clustering a feature difference-based event separation is accomplished with a two group K-means procedure (i.e., 2-means) for which the algorithm is named. In the 2-means algorithm, the feature differences are divided into two groups such that variation from the group means is minimized. The boundary divides the two groups.

The calculation of boundaries and clusters can also be undertaken using a variance-based event clustering algorithm as disclosed in U.S. patent application Ser. No. 10/997,411; filed 17 Nov. 2004, entitled "VARIANCE-BASED EVENT CLUSTERING". The variance-based algorithm calculates the average and a variance measure, such as the standard deviation, of all of the feature differences and determines the boundary based on these values. Any time difference that diverges from the set average by more than a certain number of standard deviations is considered an event. The exact number of standard deviations, the event threshold, is calculated from the average and standard deviation of the set. The computing of the variance metric from the feature values is in accordance with ordinary statistical procedures. The variance metric is a statistical parameter related to the variance of a set of values relative to a particular average. Examples of suitable variance metrics include: standard deviation, variance, mean deviation, and sample variation. The boundary, which is comparable to the grouping threshold of U.S. patent application Ser. No. 10/997,411, is set relative to the variance metric. For example, when the variance metric is the standard deviation, the boundary is a multiple of standard deviation. A suitable multiple for a particular use can be determined heuristically using an exemplary set of images.

The method can also be used with other grouping methods, including hierarchical clustering.

Different grouping methods can be used in different tiers. For example, two-means clustering can be used to compute a first cluster, followed by use of variance-based clustering to computer a second cluster, and so on. An advantage of this approach is that quicker, but less precise approaches can be used for one or more earlier tiers and slower, but more precise, approaches can be used for later tiers. This reduces overall computation time of the clusters without an overall loss of precision. Another advantage of this approach is that it permits the use of the most suitable methods for each tier. For example, properties of the two-means clustering technique may make it more suitable for finding boundaries among large feature differences than variance-based clustering. The suitability of approaches for the different tiers can be determined heuristically through testing of image databases.

Following clustering of feature differences, the clusters are designated (70). Designation determines the organization of events in the database during further use, presentation to the user, further analysis, etc. All of the clusters of feature differences except the last can be designated as having feature differences between events and the last can be designated as a non-event cluster of feature differences within events. Alternatively, different clusters or sets of clusters can be designated as events and as subdivisions, i.e., subevents dividing respective events, sub-subevents dividing respective subevents, and so on. In a simple case, each cluster is designated as a different level: event, subevent, etc. Alternatively, the number of clusters per level can be more than one and/or can vary, depending upon the level.

The decision on how to designate the clusters of feature differences can be made heuristically based upon an analysis of image content of the database and experience with similar databases. The decision on how to designate can also be made by a user, either initially or as an alternative to an automatically determined default designation. Since the clusters themselves are not changed by the designation step, there is little computation burden imposed by changing designations. Thus, the user can be allowed to change designations of the clusters of feature differences back and forth different ways and view the results, before making a final decision.

Further analysis can be undertaken. Event breaks can be checked. For example, within each event in an image database, the contents of the images can be analyzed to determine whether images closest in time to an adjacent event should be maintained in the event as defined by the clustering analysis, or whether the adjacent events should be merged together. Procedures for this kind of analysis are known, such as the block-based histogram comparison procedure earlier described. After the records are grouped into events, procedures can be used to further sub-classify within each event. A content analysis, as earlier described can be used for this purpose. The earlier discussed redesignation of clusters could occur before or after the further analysis, depending upon convenience and the computational burden imposed.

The method allows the different clusters of records to be treated differently in further analysis. Since each cluster contains records with a similar probability of being an event, additional analysis steps can be tuned to that probability. If the analysis is customized for each cluster of images, there is a chance for greater precision in the results. The suitability of approaches for the different tiers can be determined heuristically through testing of image databases.

For example, U.S. Pat. No. 6,606,411 discloses a method of checking event breaks by comparing multiple images across two events. For each image comparison, the following steps are used to decide whether the events should be merged.

(a) Compare the global histogram intersection to a global threshold value. If the threshold is not met, do not merge the events. Otherwise, continue with step b.

(b) Compare the block histogram intersection to a block low threshold and block high threshold value. If neither the low nor the high threshold is met, do not merge the events. If both the low and high thresholds are met, merge the events. Otherwise, continue with step c.

(c) Compare the 3-segment intersection to a 3-segment threshold. If the threshold is met, merge the events. Otherwise, continue with step d.

(d) Check for a high intersection value if the image is shifted up, down, left, or right. If none of the intersection values are high, do not merge the events. Otherwise, shift the image toward the high intersection value and repeat from step b.

The merge decisions made in each step of the comparison depend on specific threshold values. Consequently, the values of the global, block low, block high, and 3-segment thresholds have a significant effect on the result of the comparison. If the threshold values are decreased, more thresholds will be met and more events will be merged; alternatively, if the threshold values are increased, fewer thresholds will be met and more events will be preserved. The influence of the threshold values make them a good target for customization based on the cluster of the feature difference between the events. High threshold values can be used when comparing the boundaries of events separated by feature differences from the "most likely event" cluster. Likewise, low threshold values can be used when comparing events separated by feature differences from the "unlikely events" cluster. This customization can allow the event boundary comparison to maintain more of the most probable event separations, and merge more of the least probable event separations. Exact values of the thresholds for different clusters can be chosen empirically.

U.S. patent application Ser. No. 10/997,411; filed 17 Nov. 2004, entitled "VARIANCE-BASED EVENT CLUSTERING" discloses a method for verifying event boundaries based on location information. The method includes finding the average and statistical variation of a set of feature differences and computing an event threshold from an event threshold function. Feature differences that vary from the average by more than the event threshold are considered event differences and the remaining are considered non-event differences. This method can be used to confirm whether feature differences from multiple tiers of feature difference clusters should be considered to represent gaps between events. The location information of each cluster can be analyzed with the variance-based approach and different event threshold functions can be used for each cluster. Since the event threshold function effects which feature differences are considered to represent separations of events, different functions can be selected for the clusters to maintain more event boundaries in high probability clusters and merge more boundaries in low probability clusters.

In a particular embodiment, the feature value differences are edited, prior to clustering, to exclude those in one or more ranges of values. This technique can be helpful for adjusting the number of tiers produced by some grouping methods like two-means clustering. If many small feature differences are omitted the method can identify a larger number of tiers, with smaller clusters. Alternatively, if many large time differences are omitted the method can identify a smaller number of tiers, with larger clusters. Testing of this technique with a database of images having date-time feature differences indicated that editing to exclude time differences of less than a minimum duration provided more accurate cluster boundaries. A preferred range for the minimum duration was 2 to 24 minutes. A more preferred minimum duration was 8 minutes.

Figure 5:
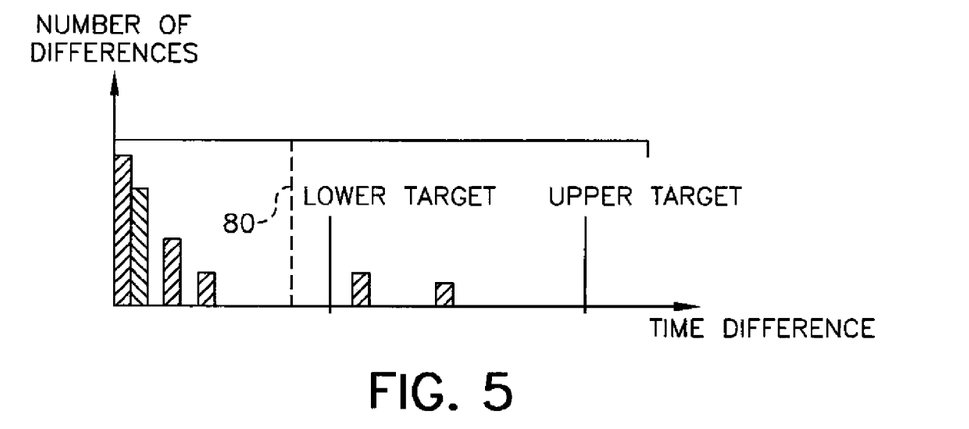
FIGS. 5-6 are histograms illustrating the application of a target range in another embodiment of the method of FIG. 1.
Figure 6:
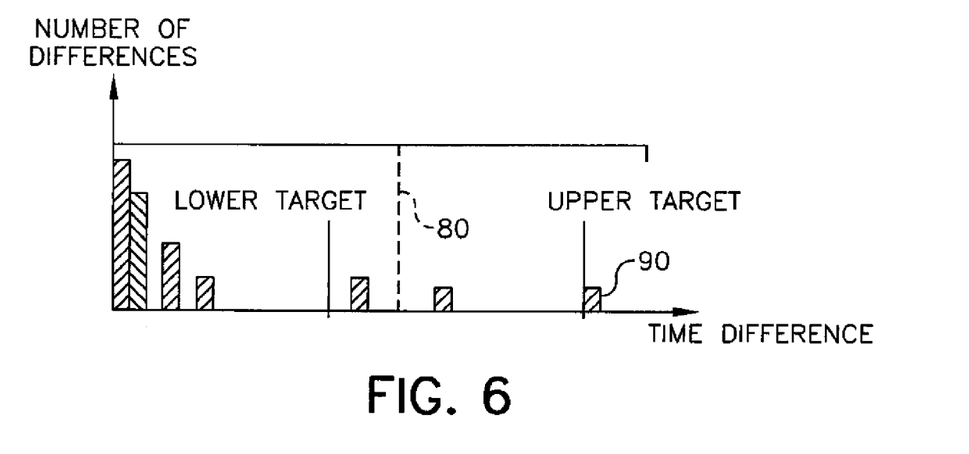

Referring to FIGS. 5-6, to promote uniformity between different databases of records (such as different image sets), in particular embodiments, tier separations (i.e. boundaries) can be shifted toward specific target ranges. The target range of each tier is defined by upper and lower targets or bounds.

The lower bound of each range can conveniently serve the upper bound for the next tier. Target ranges can be set for each tier based upon values determined heuristically using similar collections of records. Similarity can be determined manually or by use of image content analysis or the like. In a particular embodiment, target ranges are applied according to the following steps:

(a) Find the boundary (reference numeral 80 in FIGS. 5-6).
(b) Compare the boundary to the tier's lower bound defined by the target range.
(c) If the boundary is above the lower bound, accept the result; otherwise, continue with step d.
(d) Recalculate the boundary on the set of feature differences plus a single simulated feature difference (reference numeral 90 in FIG. 6) equal to the tier's upper bound. The simulated feature difference is included only for the purpose of this calculation and serves to shift the boundary toward the intended range.

The shifting of boundaries toward target ranges can be performed automatically or can be presented along with unshifted boundaries, as alternatives for user selection.

EXPERIMENTAL

Figure 7:
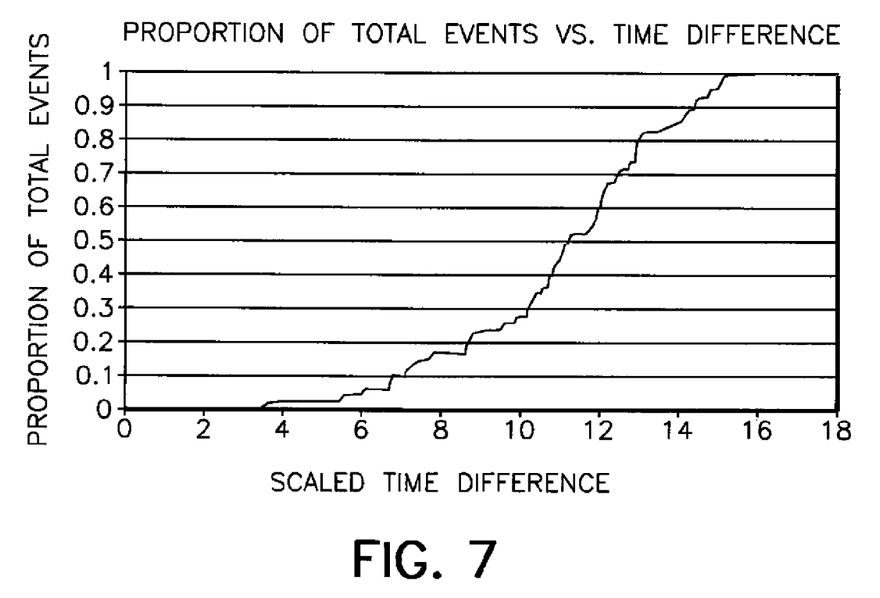
FIG. 7 is an experimentally determined plot of proportion of total events versus time difference for a database of images.

The purpose of the method is to group together time differences with a similar probability of being gaps between events. The algorithm was evaluated against this goal through tests with real consumer images. Over 12000 images were collected from 15 participants. Each participant classified his own images into events. The boundaries were later inspected by a third party judge and a small number of abnormalities were corrected. The resulting event judgments for each set were plotted against scaled time as in FIG. 7.

Figure 8:
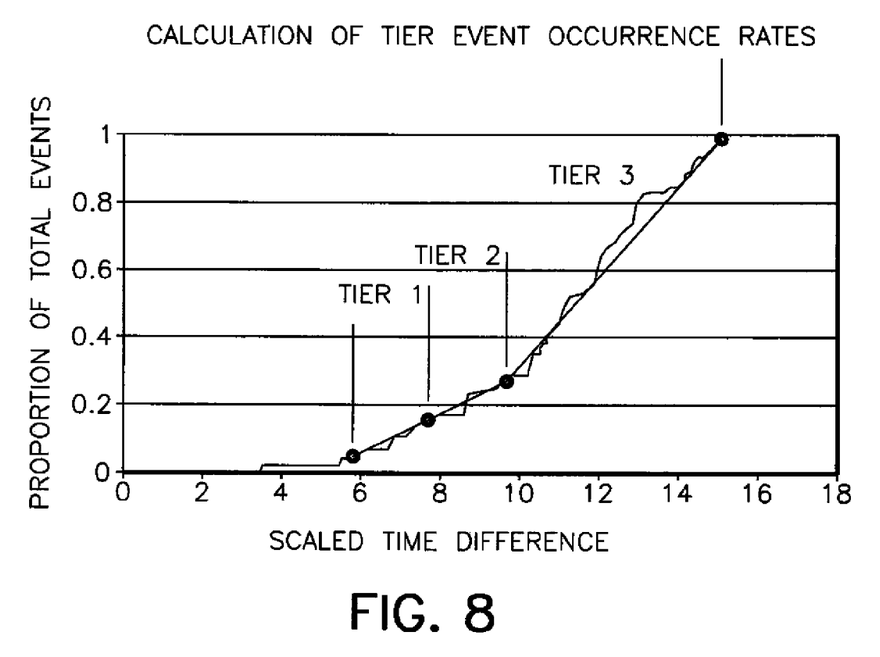
FIG. 8 is the same plot as FIG. 7, with boundaries for clustering tiers superimposed.

The sets of images were then divided into different time difference ranges (tiers) by the multi-tiered method disclosed herein. Each time difference range was mapped to the event judgments to find the proportion of events at the start and end of the tier. Based on these values, the rate at which events occur in that tier was calculated. An example is shown in FIG. 8, where the slope of each tier line depicts the event occurrence rate.

Figure 9:
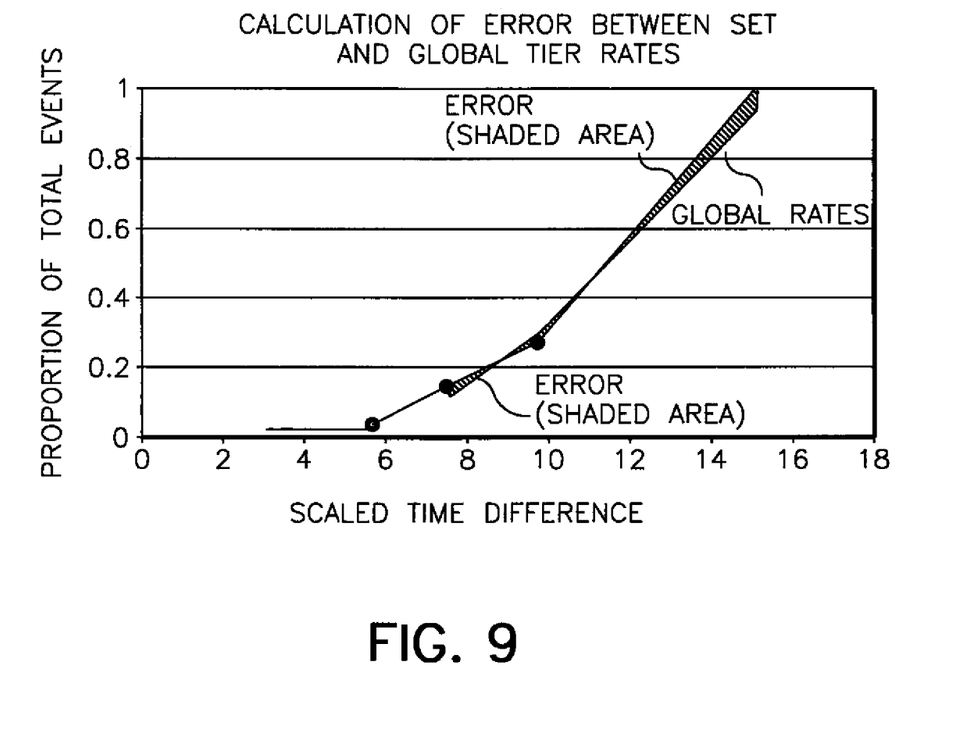
FIG. 9 is a plot of the difference between set and global event occurrence rates versus proportion of events for the data of FIG. 7.

The event occurrence rates were found for all the tiers in each of the 15 image sets. The rates for each tier were then averaged across all image sets yielding a global event occurrence rate for each tier. Since each tier is meant to represent a similar event probability across image sets, there should be little variation in the event occurrence rates of a tier. To test this hypothesis the difference between the set and global event occurrence rates were measured at regular intervals (see FIG. 9). These error values were then averaged across all sets to find the average occurrence rate error for that set of tier boundaries.

The occurrence rate error was calculated as described above for numerous variations of the multiple-tiered approach. As might be expected, one of the major factors that influences the result is the number of tiers. Tests were run with as few as one and as many as nine tiers. The resulting occurrence rate error values are shown in Table 1. For these tests, the tier target values were calculated as the midpoint between k-means centers (with k equal to the number of tiers).

Further experiments with the tier boundaries from this test revealed that the occurrence rate error does relate to event clustering performance. The high occurrence rate error values achieved with one or two tiers leads to relatively low event clustering quality. Event clustering performance is fairly good with 3 tiers and increases with the number of tiers. As suggested by the occurrence rate error values, the performance reaches a peak at about 6 tiers and increases little with additional tiers. Based on these results a minimum of three tiers is currently preferred.

TABLE 1

| Number of Tiers | Occurrence Rate Error |
| --- | --- |
| 1 | 3.009369 |
| 2 | 1.64985 |
| 3 | 1.086687 |
| 4 | 0.943924 |
| 5 | 0.923531 |
| 6 | 0.897764 |
| 7 | 0.892307 |
| 8 | 0.886082 |
| 9 | 0.905515 |

Minimization of the occurrence rate error can be used as a stopping criterion for clustering the feature differences. In this case, the number of tiers for a database being classified is set by the number of tiers corresponding to a heuristically determined minimum occurrence rate error for a similar database of records or for a sample of records from the database being classified.

The invention has been described in detail with particular reference to certain preferred embodiments thereof, but it will be understood that variations and modifications can be effected within the spirit and scope of the invention.

The invention claimed is:

1. A method for classifying a sequence of digital records into events based upon feature values associated with each of said digital records, said method comprising using a processor to perform the steps of:
   determining feature differences between consecutive said digital records;
   ranking said feature differences to provide an unclustered feature difference set;
   computing a sequence of three or more mutually exclusive feature difference clusters, each feature difference cluster corresponding to a different probability of representing separations between events, wherein at least one boundary between feature difference clusters is constrained to fall within a specified range, the feature difference clusters being computed using a 2-means event clustering algorithm to determine at least one of said feature difference clusters and using a different clustering algorithm based upon a variance metric to determine at least one other of said feature difference clusters; and
   classifying the sequence of digital records into events using the feature differences that fall into one or more of the feature difference clusters.

2. The method of claim 1 further comprising designating respective said feature differences in the cluster lowest in said decreasing order as being within events and designating respective said feature differences in the feature difference cluster highest in said decreasing order as being between events.

3. The method of claim 2 further comprising designating each of said feature differences in one or more intermediate feature difference clusters between said lowest and highest feature difference clusters as being between events.

4. The method of claim 3 further comprising analyzing respective said feature differences in at least one of said intermediate feature difference clusters differently than respective said feature differences in said highest feature difference cluster.

5. The method of claim 2 further comprising designating respective said feature differences in at least one intermediate feature difference cluster between said lowest and highest feature difference clusters as being event subdivisions.

6. The method of claim 1 further comprising stopping said computing responsive to a predetermined stopping criterion.

7. The method of claim 1 further comprising, during said computing of said sequence:
repeatedly presenting event organizations associated with said feature difference clusters to a user; and
allowing said user to stop said computing following each said presenting when the user determines that the events have been sufficiently distinguished.

8. A computer program product for image classification, the computer program product comprising computer readable storage medium having a computer program stored thereon for performing the steps of claim 1.

9. A method for classifying a sequence of digital records into events based upon feature values associated with each of said digital records, said method comprising using a processor to perform the steps of:
determining differences between the feature values of consecutive said records to provide feature differences;
ranking said feature differences to provide an unclustered feature difference set;
sequentially partitioning a plurality of feature difference clusters of said feature differences from said unclustered feature difference set to form at least three feature difference clusters, said feature difference clusters being mutually exclusive, said partitioning being in decreasing order of relative likelihood of respective said feature differences representing separations between events, wherein at least one partition boundary between feature difference clusters is constrained to fall within a specified range, said partitioning comprising using a 2-means event clustering algorithm to partition at least one of said feature difference clusters and using a difference clustering algorithm based upon a variance metric to partition at least one other of said feature difference clusters; and
classifying the sequence of digital records into events using the feature differences that fall into one or more of the feature difference clusters.

10. The method of claim 9 further comprising designating each of said feature differences in at least two of said feature difference clusters as being between events.

11. The method of claim 10 further comprising analyzing respective said feature differences of said at least two feature difference clusters differently.

12. The method of claim 11 wherein said analyzing further comprises computing feature difference subclusters.

13. The method of claim 9 further comprising designating each of said feature differences in a first partitioned of said feature difference clusters as being between events and each of said feature differences in at least one other of said feature difference clusters as being event subdivisions.

14. The method of claim 9 further comprising continuing said partitioning until a predetermined stopping criterion is reached.

15. The method of claim 14 wherein said stopping criterion is a predetermined value of an event occurrence rate.

16. The method of claim 14 wherein said stopping criterion is a limit feature difference.

17. The method of claim 16 wherein said feature differences are time differences and said limit feature difference is a minimum time difference in the range of 8 to 60 minutes.

18. The method of claim 17 wherein said limit feature difference is a minimum time difference of 16 minutes.

19. The method of claim 9 wherein said digital records each have a single image or image sequence.

20. A method for classifying a database of digital records into events, said digital records each having an associated feature value, said features values being ordinal and having a dimensionality of one or more, said records being ranked in order of respective said feature values, said method comprising using a processor to perform the steps of:
determining feature value differences between consecutive said digital records;
ranking said feature value differences to provide an unclustered feature difference set;
calculating an boundary from said feature value differences of said unclustered feature difference set, said boundary defining a feature difference cluster of said differences of said unclustered feature difference set relatively more likely to represent separations between events, said boundary redefining said unclustered feature difference set to exclude said feature difference cluster, said boundary being constrained to fall within a specified range;
repeating said calculating at least once to form additional feature difference clusters; and
classifying the sequence of digital records into events using the feature differences that fall into one or more of the feature difference clusters,
wherein one of the boundaries is calculated using a 2-means event clustering algorithm to partition at least one of said feature difference clusters and at least one other boundary is calculated using a different clustering algorithm based upon a variance metric.

21. The method of claim 20 wherein said calculating is repeated until from 2 to 5 boundaries between feature difference clusters are provided.

22. The method of claim 21 wherein said feature differences are one of: time differences, location differences, content similarity differences, and combinations of two or more of these differences.

23. The method of claim 20 wherein said feature differences are vectors of time and location differences.

24. The method of claim 20 wherein said repeating continues until a predetermined stopping criterion is reached.

25. The method of claim 20 further comprising designating each of said feature differences in a first defined of said clusters as being between events and each of said feature differences in all other of said clusters as being within events.

26. An apparatus for organizing a database of image files classified into events based upon date-time information associated with each of said image files, said apparatus comprising:
means for determining feature differences between consecutive said digital records;
means for ranking said feature differences to provide an unclustered feature difference set;
means for computing a sequence of three or more mutually exclusive feature difference clusters of said feature differences in decreasing order of relative likelihood of respective said feature differences representing separations between events, wherein at least one boundary between feature difference clusters is constrained to fall within a specified range, the feature difference clusters being computed using a 2-means event clustering algorithm to determine at least one of said feature difference clusters and using a different clustering algorithm based upon a variance metric to determine at least one other of said feature difference clusters; and means for designating respective said feature differences in the feature difference cluster lowest in said decreasing order as being within events and designating respective said feature differences in the feature difference cluster highest in said decreasing order as being between events.

* * * * *

UNITED STATES PATENT AND TRADEMARK OFFICE
CERTIFICATE OF CORRECTION

PATENT NO.        : 7,643,686 B2                                   Page 1 of 1
APPLICATION NO. : 11/197243
DATED             : January 5, 2010
INVENTOR(S)       : Bryan D. Kraus et al.

It is certified that error appears in the above-identified patent and that said Letters Patent is hereby corrected as shown below:

| Column | Line | |
|---|---|---|
| Title Page Col. 2 (Other Publications) | 5 | Delete "Classifiring" and insert -- Classifying --, therefor. |
| 15 | 23 | In Claim 9, after "said" insert -- digital --. |
| 15 | 37 (Approx.) | In Claim 9, delete "difference" and insert -- different --, therefor. |
| 15 | 54 (Approx.) | In Claim 13, delete "partitioned" and insert -- partition --, therefor. |
| 16 | 8 | In Claim 20, after "said" insert -- digital --. |
| 16 | 15 | In Claim 20, delete "an" and insert -- a --, therefor. |
| 16 | 18 | In Claim 20, before "differences" insert -- feature --. |
| 16 | 24 | In Claim 20, after "calculating" insert -- step --. |
| 16 | 47 (Approx.) | In Claim 25, delete "defined" and insert -- partition --, therefor. |
| 18 | 2 | In Claim 26, after "being" insert -- boundaries --. |

Signed and Sealed this

Twentieth Day of July, 2010

David J. Kappos
*Director of the United States Patent and Trademark Office*